March 12, 1957 R. S. CHAMBERLIN ET AL 2,784,722
DENTAL FLOSS DISPENSER AND HOLDER
Filed May 21, 1956
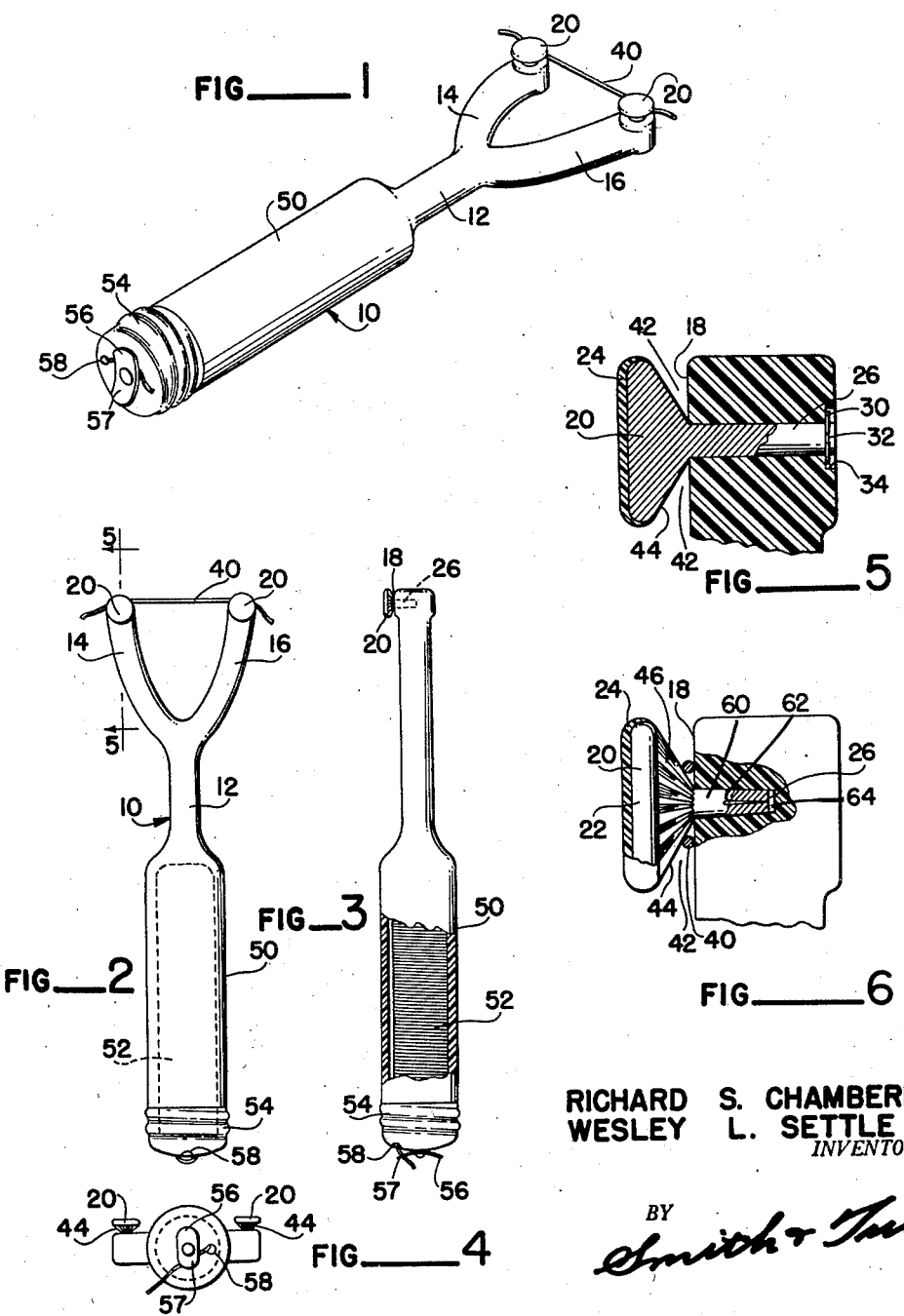
RICHARD S. CHAMBERLIN
WESLEY L. SETTLE
INVENTOR.
BY
Smith & Tuck

United States Patent Office 2,784,722
Patented Mar. 12, 1957

2,784,722

DENTAL FLOSS DISPENSER AND HOLDER

Richard S. Chamberlin and Wesley L. Settle,
Poulsbo, Wash.

Application May 21, 1956, Serial No. 586,238

4 Claims. (Cl. 132—92)

This present device relates to the general art of dental floss holding devices and, more particularly, to a device in which provision is made in the handle to store a reserve supply of dental floss, and which container is provided with a knife-edge clip so that short pieces of dental floss can be cut from the storage spool. Means are provided in the fork-like dental floss holder so that the relatively short piece of floss can be securely anchored with as much tension as is desired on the same. The handling of dental floss for cleaning between the teeth has always posed a rather difficult problem. Normally it is desirable that the dental floss be stretched fairly tight and, secondly; that it should be presented radially to the curvature of the tooth formation so that it will squarely enter the interspace between adjacent teeth.

In the past considerable difficulty has been experienced in using dental floss due to the fact that one end must be held, normally, by the thumb and forefinger of one hand and both of these finger tips must be placed in the oral cavity in order to hold the inner end of the dental floss. In addition to the difficulties involved, many persons feel that this is not a sanitary procedure. As a result of the difficulties encountered in using dental floss, many attempts have been made to provide devices that would assist in the using of the dental floss and further to provide a convenient storage for the same.

These devices that have been observed and studied have not only provided for the storage of the dental floss in the handle of the device, but also by various means lead the floss up and across spaced prongs, and then usually back down to some fastening device. This arrangement provides a convenient storage for the dental floss and an extractable manner of using the same. However, in such devices, generally, they require several times as much dental floss for each use as is actually needed to span the distending forks and this leaves the user with but two general options; one to use an excessive amount of the dental floss, or to use dental floss that has been exposed to the conditions of the former use and further, a prolonged period of storage. It is to generally overcome the unsatisfactory conditions presented through the use of the present dental floss holders that we have provided our present improved device for dispensing the dental floss and then securely holding the relatively short piece needed for the instant use.

The principal object of this present invention therefore is to provide first, a sanitary, closed storage receptacle for spools of dental floss wherein the dental floss is fully protected from all contamination, either during use or during storage periods of the device.

A further object of this invention is to provide convenient means associated with the storage compartment for cutting off the desired amount of dental floss, as required for each use.

A further object of this device is to provide a fork-like holder for the dental floss, when put to use, which is provided with means for securing the relatively short piece of dental floss in operational position and also to provide convenient means so that any desired tension can be applied to the floss and that tension will be held by the device during the period of use.

Further objects, advantages and capabilities will be apparent from the description and disclosure in the drawings, or may be comprehended or are inherent in the device.

In the drawings:

Figure 1 is a perspective view of a dental floss holder, made after the teachings of this present invention;

Figure 2 is a front view of a dental floss dispenser and holding unit;

Figure 3 is a side view of the device of Figure 1;

Figure 4 is an end elevation of the device of Figure 1;

Figure 5 is an enlarged fragmentary sectional view illustrating the construction of the dental floss securing and tensioning means employed to hold the dental floss during its period of use; and Figure 6 is a view in partial section, similar to Figure 5, but illustrating a modified form of the floss holding device.

Referring more particularly to the disclosure in the drawings, the numeral 10 designates generally our dental floss holder and dispensing device. It consists essentially of two closely associated but not directly coacting parts. The device is made slender in form in its mid-section, indicated at 12, so that it can easily be put into the mouth and turned at various angles with the minimum of interference with the teeth or tongue.

The upper end of body 10 is bifurcated to provide the two spaced arms 14 and 16. These are spread sufficiently so that when dental floss is stretched between the two in an operational manner, that the amount of dental floss will be adequate to be entered between any two teeth, but should not have any excess size in that it then would be tending to interfere with its free use. Each of the arms 14 and 16 is provided near its outer end with a floss holding device consisting of the face 18 of the arms, as 14 and 16, and the peg member 20 which is preferably revolvably positioned with its axis of revolution at right angles to the plane formed by arms 14 and 16, after the showing of the drawings. The arms themselves are made of plastic or similar material and surface 18 is a smooth, more or less, frictionless surface. The key or peg member 20 is preferably formed of stainless steel to the end that it may be easily water cleaned and will not require careful drying in order to try to prevent corrosion and the like.

Key member 20 is preferably provided with a circular form of head, as 22, which is preferably given a capping of plastic, as 24, not that it needs it for non-corrosive properties, but rather, that arranging it so any bumping of the teeth with our device will bring a plastic surface into contact with the teeth and this is resilient and is not apt to damage the teeth in any way. The peg member is provided with a shaft-like portion 26. This may take on a tapered form such as is employed in the musical instruments as a string tightening peg or, preferably, following the showing in the drawings, a spring grip as 30 is sprung around a narrow annular groove 32 formed in the end of the cylindrical portion 26. This member, which again is preferably of stainless steel, seats within a small recess 34 and thus holds the device against movement to the left, as viewed in the drawings, yet permits it to turn freely. In use the short piece of dental floss 40 is stretched across the fork portion of the holder and engages within the V-shaped openings 42 formed between the tapering inner surface 44 of the head 22 and the face 18 of the plastic arms, as 14 and 16. This inner tapering face is preferably ribbed, as at 46, so that it will tend to bite into dental floss. This, together with the rather gradual slope of the grooved surface provides an easy means for wedging the dental floss in this narrow V, and holding it quite securely. The friction of the dental floss under pressure is sufficient to prevent the peg member 30 from backing off. If it is desired to have the dental floss tighter than can be conveniently stretched with the fingers, then a small amount of turning through just a portion of a revolution of head 20, will tighten up the dental floss much as a string is tightened, as for instance, on a violin, and whatever tension is desired would be held by the friction locking means, as described. It is to be noted that with such an arrangement the amount of dental floss required is only a fraction of an inch more than necessary to span between the two arms 14 and 16.

The handle portion 50 of our device is enlarged so as to provide an interior bore adequate to house a standard size spool of dental floss, indicated as 52. Now it is to be noted that this dental floss is not in any way directly connected to the part of the dental floss in use, therefore it will be preserved for long periods of storage or use without any fear of contamination.

The chamber in handle 50 is provided with, preferably, a screw cap member 54 and this member in addition to providing a closure to protect spool 52 has formed within it, either as a spearate part if the cap is metal or molded into the same if it is made of plastic, retaining or securing clips, as 56 and 57. These provide means for anchoring the end of the dental floss that extends outwardly from the spool being let out through a small opening 58 in the cap or cover member.

When it is desired to use the dental floss an amount is pulled out, which will be sufficient for one use, then this is turned around both of the clips 56, 57, and as the under edges of these clips are sharpened or serrated a quick pull severs the dental floss, leaving a portion of it under each of the clips 56 and 57. The part cut is then stretched across the two spaced arms 14 and 16, and secured at each end by members 20. When it is again desired to cut another piece of dental floss the fact that clips 56 and 57 are spaced apart permits the tip of the finger to flick out the loose end which is only frictionally held under clips 56 and 57. As this loose end is unwound from under the two clips it will be found to be of substantially right length so that by grasping it between the thumb and fore finger another usable length of the dental floss can be pulled off the spool 52, wrapped again around the two clips and cut as the final operation, ready for use again.

In Figure 6, the device is modified in the manner of securing peg member 20 in place. Peg shank 60 is tapered and split at 62 and is pressed into a smaller frustum shaped opening 64 in the arm 14 or 16. The shank is retained in place by the spring action of the split shank stock, which tends to resume normal contour, and the resulting frictional engagement with the walls of opening 64.

It is believed that it will be clearly apparent from the above description and the disclosure in the drawings that the invention comprehends a novel construction of a dental floss dispenser and holder.

Having thus disclosed the invention, we claim:

1. A dental floss holder, comprising: an elongated body having a handle at one end and forked at the other end forming two arms, said arms having on corresponding faces in a plane parallel to the plane of the fork securing means for a length of dental floss comprising a head on each arm protruding from the arm face which is inwardly tapered as it extends toward said surface at an angle small enough that dental floss may be wedged between the tapered head surfaces and the arm face to secure the dental floss against substantial tension applied to the same whereby the length of dental floss may be secured in place by winding each end around one of said heads under tension, said heads of said securing means being rotatably mounted whereby dental floss thereon may be tightened by rotating said heads, said securing means including a shank on each head and each arm having an opening in which said shank is rotatably disposed, the end of said opening opposite said head being countersunk and a spring grip disposed in the countersunk portion and engaged in an annular groove in the adjacent shank portion to hold the shank in place.

2. A dental floss holder, comprising: an elongated body having a handle at one end and forked at the other end forming two arms, said arms having on corresponding faces in a plane parallel to the plane of the fork securing means for a length of dental floss comprising a head on each arm protruding from the arm face which is inwardly tapered as it extends toward said surface at an angle small enough that dental floss may be wedged between the tapered head surfaces and the arm face to secure the dental floss against substantial tension applied to the same whereby the length of dental floss may be secured in place by winding each end around one of said heads under tension, said securing means including a resilient shank for each head, said shank being tapered and split and the corresponding arm having a frustum shaped opening smaller than said shank and said shank being pressed into said opening whereby the split end is compressed and spring presses against the walls of said opening holding the shank in place.

3. A dental floss holder, comprising: an elongated body having a handle at one end and forked at the other end forming two arms, said arms having on corresponding faces securing means for a length of dental floss comprising a head on each arm protruding from the arm face which is inwardly tapered as it extends toward said surface at an angle small enough that dental floss may be wedged between the tapered head surfaces and the arm face to secure the dental floss against substantial tension applied to the same whereby the length of dental floss may be secured in place by winding each end around one of said heads under tension, and said handle being hollow and open to the adjacent end opposite the forked end and of a size to accept a standard dental floss coil, and a cap for the end having an opening through which dental floss may be led and having a clip blade secured thereon having an edge disposed to accept dental floss from said opening between the blade and the cap surface and the blade having a sharp surface positioned to cut dental floss caught thereunder upon application of force to the floss free end.

4. A dental floss holder, comprising: an elongated body having a handle at one end and forked at the other end forming two arms, said arms having securing means for a length of dental floss to be stretched between said arms, and said handle being hollow and open to the adjacent end opposite the forked end and of a size to accept a standard dental floss coil, and a cap for the end having an opening through which dental floss may be led and having a clip blade secured thereon having an edge disposed to accept dental floss from said opening between the blade and the cap surface and the blade having a sharp surface positioned to cut dental floss caught thereunder upon application of force to the floss free end.

References Cited in the file of this patent
UNITED STATES PATENTS

| | | |
|---|---|---|
| 1,990,404 | Doner | Feb. 5, 1935 |
| 2,467,221 | Pastle | Apr. 12, 1949 |
| 2,607,358 | Maas | Aug. 19, 1952 |

FOREIGN PATENTS

| | | |
|---|---|---|
| 107,521 | Australia | May 28, 1938 |